US008335891B2

(12) United States Patent
Davis et al.

(10) Patent No.: US 8,335,891 B2
(45) Date of Patent: Dec. 18, 2012

(54) METHOD AND SYSTEM FOR CONFIGURING A STORAGE ARRAY

(75) Inventors: Daniel S. Davis, Houston, TX (US); Mark J. Thompson, Spring, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 709 days.

(21) Appl. No.: 12/502,485

(22) Filed: Jul. 14, 2009

(65) Prior Publication Data

US 2011/0016283 A1 Jan. 20, 2011

(51) Int. Cl.
*G06F 12/00* (2006.01)
*G06F 13/00* (2006.01)

(52) U.S. Cl. ......... 711/114; 711/100; 711/112; 711/154

(58) Field of Classification Search ............. 711/100, 711/111, 114, 113, 154, 112
See application file for complete search history.

(56) References Cited

U.S. PATENT DOCUMENTS

| | | | |
|---|---|---|---|
| 5,548,712 A | 8/1996 | Larson | |
| 6,192,470 B1 * | 2/2001 | Kelley et al. | 713/1 |
| 6,263,382 B1 * | 7/2001 | Bartlett et al. | 710/10 |
| 6,578,141 B2 * | 6/2003 | Kelley et al. | 713/1 |
| 6,609,145 B1 | 8/2003 | Thompson | |
| 6,618,254 B2 | 9/2003 | Ives | |
| 6,629,264 B1 | 9/2003 | Sicola | |
| 6,643,795 B1 | 11/2003 | Sicola | |
| 6,658,590 B1 | 12/2003 | Sicola | |
| 6,694,479 B1 | 2/2004 | Murthy | |
| 6,772,310 B2 | 8/2004 | Thompson | |
| 6,874,103 B2 | 3/2005 | Cepulis | |
| 6,898,668 B2 | 5/2005 | Thompson | |
| 6,918,007 B2 | 7/2005 | Chang | |
| 6,959,262 B2 | 10/2005 | Curry, III | |
| 7,028,177 B2 | 4/2006 | Schultz | |
| 7,080,243 B2 | 7/2006 | Ramiz | |
| 7,281,089 B2 | 10/2007 | Thompson | |
| 7,426,633 B2 | 9/2008 | Thompson | |
| 7,447,889 B2 | 11/2008 | Cartes | |
| 7,539,832 B2 | 5/2009 | Silva | |
| 7,603,585 B2 | 10/2009 | Brinkmeyer | |

\* cited by examiner

*Primary Examiner* — Tuan V. Thai

(57) ABSTRACT

There is provided a system and method of configuring a storage array. An exemplary method includes generating information within a storage array controller, the information corresponding to a menu of user options. The exemplary method also includes sending the information from the array controller to a user interface module. The exemplary method also includes sending user instructions comprising a selected menu option from the user interface module to the array controller. The exemplary method also includes executing a configuration task associated with the selected menu option.

12 Claims, 4 Drawing Sheets

METHOD AND SYSTEM FOR CONFIGURING A STORAGE ARRAY

BACKGROUND

In a typical computer system, some peripheral devices, such as storage devices and graphics processors, for example, may be configured by the computer's basic input/output system (BIOS.) At startup, the BIOS may load Option ROM code from a peripheral device into the computer systems random access memory (RAM) and execute the Option ROM as part of the system's Power-Up Self Test. The Option ROM code may include various programs and utilities configured to establish communication between the computer system and the peripheral device. In X86-based computer systems, the Option ROM programs typically execute during "real address mode," or "big real mode," which persists prior to loading the computer's operating system. During big real mode, the host processor may only have access to approximately 1 megabyte (MB) of RAM, commonly referred to as "base memory," that may be used for code execution.

BRIEF DESCRIPTION OF THE DRAWINGS

Certain exemplary embodiments are described in the following detailed description and in reference to the drawings, in which.

DETAILED DESCRIPTION OF SPECIFIC EMBODIMENTS

The firmware of a computer system may often include a configuration utility which can be initiated by a user during real mode. The functionality offered by such a configuration utility will generally be limited in order to adhere to the 1 MB base memory limit of real mode operation. To provide a more sophisticated configuration utility, the configuration utility may be programmed to operate in "protected mode." However, utilizing protected mode may present challenges in maintaining consistency across several computing platforms and maintaining backward compatibility with existing platforms.

For example, in protected mode, the BIOS services provided by the system ROM for operating the keyboard, video, and mouse will typically not be accessible. Thus, hardware drivers may be loaded by the protected-mode operating system to provide access to the keyboard, video, and mouse. The use of additional hardware drivers introduces risk of potential incompatibilities across different computing platforms. Furthermore, if a configuration utility is configured to run during protected-mode, the computer system is also typically configured to re-boot after the configuration utility is executed and before the new settings implemented by the configuration utility are implemented.

In accordance with an exemplary embodiment of the present invention, a computing system is coupled to a peripheral device such as storage array, for example, a redundant array of inexpensive disks (RAID). The storage array may be coupled to an array controller that serves as a gateway between the storage array and a host processor. The array controller may include one or more processors and a local RAM used to run various programs included in the array controller's firmware. The array controller firmware may include a configuration utility that allows a user to configure the storage array and runs on the array controller rather than the host processor. To communicate with the user, the configuration utility may send display data to a monitor through the host processor and may receive key strokes from a keyboard through the host processor. Because the configuration utility uses the local RAM existing on the array controller, rather than the base memory available to the host processor, the configuration utility is able to access more than 1 MB of memory for code execution. Thus, the 1 MB base memory limitation may be avoided even though the configuration utility runs during real mode.

Figure 1:
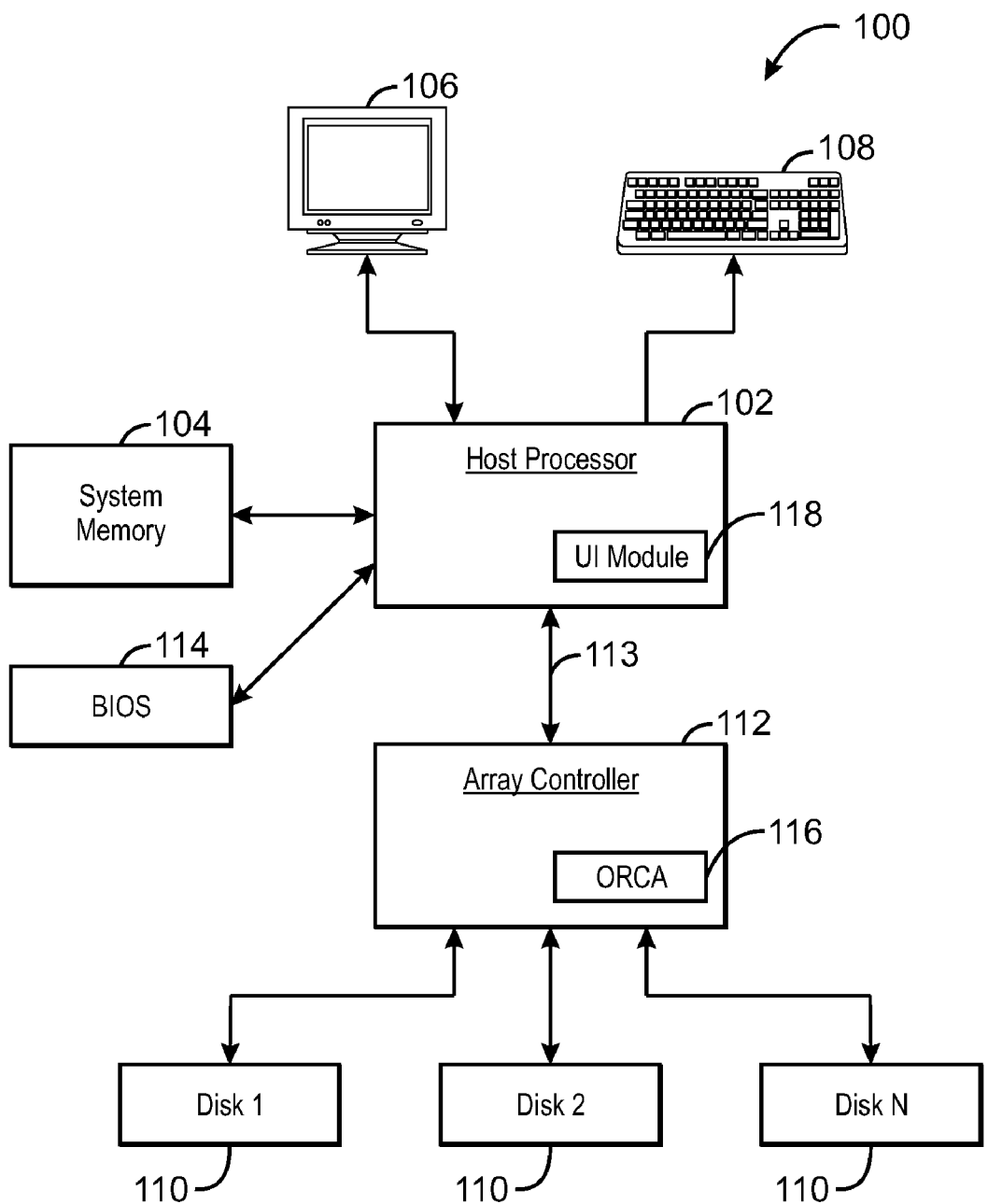
FIG. 1 is a block diagram of a computer system adapted to configure a storage array, according to an exemplary embodiment of the present invention.

FIG. 1 is a block diagram of a computer system adapted to configure a storage array, according to an exemplary embodiment of the present invention. The computer system is generally referred to by the reference number 100. Those of ordinary skill in the art will appreciate that the computer system 100 may include hardware elements including circuitry, software elements including computer code stored on a machine-readable medium or a combination of both hardware and software elements. Additionally, the functional blocks shown in FIG. 1 are but one example of functional blocks that may be implemented in an exemplary embodiment of the present invention. Those of ordinary skill in the art would readily be able to define specific functional blocks based on design considerations for a particular computer system. In exemplary embodiments of the present invention, the computer system 100 may include a blade, for example a blade PC or a blade server.

The computer system 100 may include a processor 102 coupled to a system memory 104. The processor 102, which may be a central processing unit (CPU), is adapted to control the overall operation of the computer system 100 and may be coupled to the system memory 104 through a memory controller. The system memory 104 may include a volatile memory region such as RAM used by the processor 102 to run the various software programs running on the processor 102, such as an operating system, applications, device drivers, option ROMs, and the like. The computer system 100 may also include user interface devices, such as a monitor 106 and a keyboard 108, which may be coupled to the processor 102 to provide user control of the computer system 100.

Further, the computer system 100 may include machine readable media, or data storage devices, such as an array of disks 110. The disks 110 may be magnetic disks, optical disks, flash drives, and the like. The disks 110 may be used to store data used by the computer system 100, for example, application data, files, database records, images, and the like. In exemplary embodiments, the disks 110 may be configured in a RAID (Redundant Array of Inexpensive Disks) configuration.

The host processor 102 may access the storage media located on the disks 110 through an array controller 112. The array controller 112 may include an embedded microprocessor, for example, a MIPS processor, PowerPC processor, and the like. The array controller 112 may also include other machine-readable media, such as volatile and non-volatile memory. For example, the array controller 112 may include local RAM that may be used by the embedded microprocessor to run the various firmware programs used to control the array of disks 110. Additionally, the array controller 112 may include a machine readable medium, for example, an option ROM or a flash memory, that may be used to store the firmware programs used by the array controller 112. The array controller 112 may be coupled to the host processor 102 via a communications bus 113, for example, a Peripheral Component Interconnect Express (PCIe) bus.

The array controller 112 and the host processor 102 may be configured to communicate via commands referred to herein as "bus-master interface controller" (BMIC) commands. For example, one BMIC command may instruct the array controller 112 to read a block of data from the RAID logical drive and transfer it to the system memory 104. In some exemplary embodiments, a command structure is built in system memory 104 and the address of this command structure is written to a FIFO register on the array controller 112. Firmware on the array controller 112 reads from the FIFO, fetches the command from the system memory 104, and then returns completion status to the host processor 102 via another FIFO register in the opposite direction.

The computer system 100 may also include a BIOS 114. The BIOS 114 stores machine-readable instructions adapted to control a boot process of a computer system and to control the operation of the computer system 100 during real-mode. At startup the BIOS 114 may identify, test, and initialize peripheral devices included in the computer system 100, for example, video graphics cards, keyboard controllers, hard disks, network devices, and the like. In some embodiments, the BIOS 114 may load Option Rom code or other operating software from machine readable media residing on one or more peripheral devices, including the array controller 112. One of ordinary skill in the art will appreciate that while the BIOS 114 is loading and configuring the peripheral devices, the computer system 100 is operating in big real mode. Thus, any BIOS, firmware, or Option ROM code running on the host processor 102 during boot-up will be subject to the 1 MB memory boundary, as discussed above.

In an exemplary embodiment of the present invention, the BIOS 114 may load Option ROM code from machine readable media residing on the array controller 112, such as an option ROM. The Option ROM code from the array controller 112 option ROM may run on the host processor 102 to configure the array of disks 110 and the array controller 112. Additionally, the array controller 112 may include machine-readable instructions that are executable by the embedded processor in the array controller 112 to provide a configuration utility, referred to herein as the Option ROM Configuration for Arrays (ORCA) 116. The ORCA 116 may be launched by a user during boot-up and used to perform various configuration tasks, for example, adding or deleting a RAID volume on the disks 110, reconfiguring an existing RAID volume, detecting physical drives and logical volumes, and the like. Furthermore, the ORCA 116 utilizes the local RAM that exists on the array controller 112 rather than the system memory 104. In this way, the ORCA 116 may be able to use greater than 1 MB RAM.

Due to the fact that the ORCA 116 runs on the embedded processor in the array controller 112, the ORCA 116 may not have direct access to other peripheral devices coupled to the host processor 102, such as the monitor 106 and the keyboard 108. Therefore, to provide a user interface (UI), the option ROM code loaded from the option ROM on the array controller 112 into the system memory 104 may include a UI module 118 that runs on the host processor 102 and enables the ORCA 116 to access the monitor 106 and the keyboard 108 through BIOS interrupt calls. In this way, the user is able to interact with the ORCA 116 operating on the array controller 112.

Figure 2:
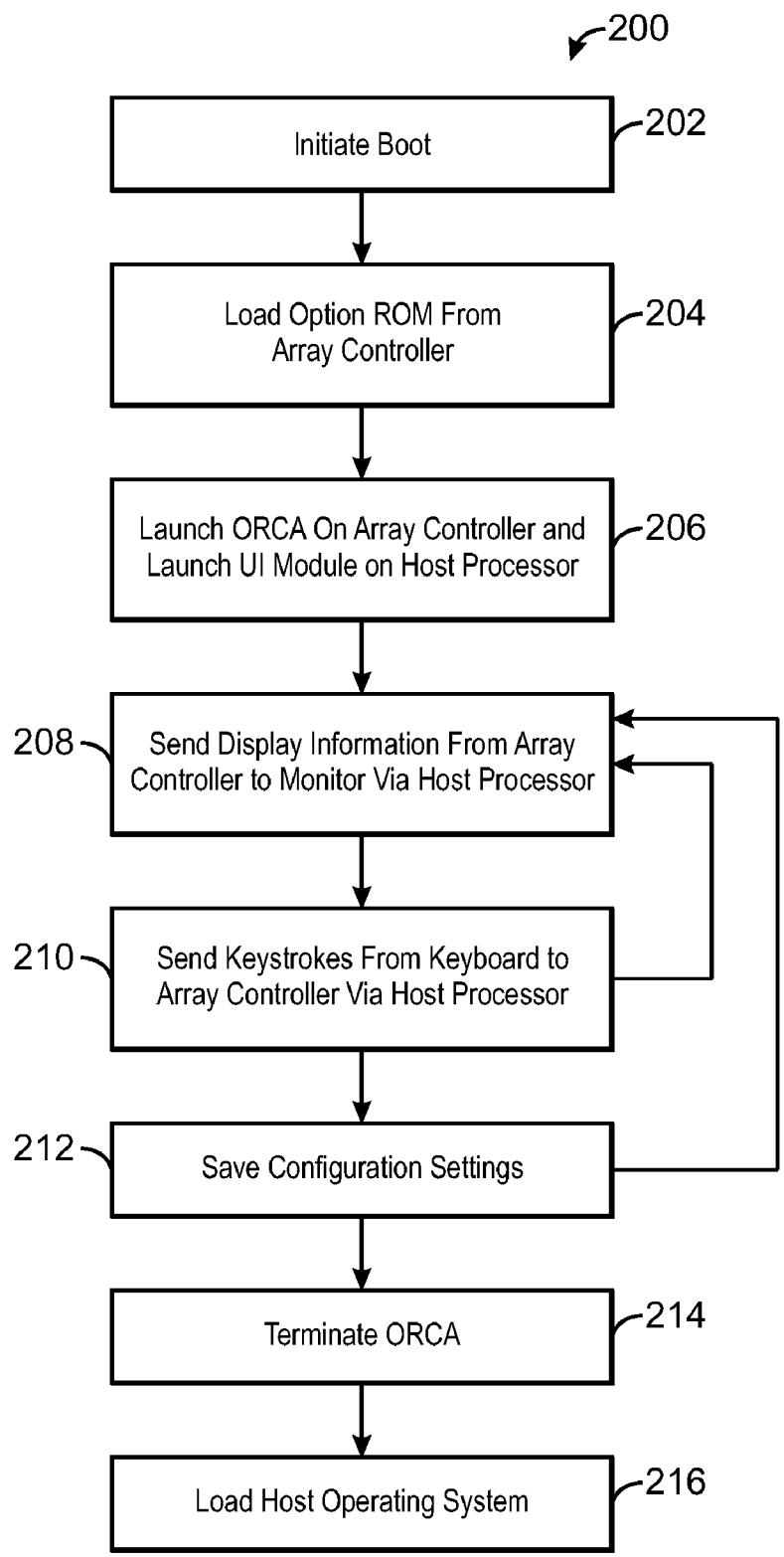
FIG. 2 is a flow chart of a method of configuring the storage array, according to an exemplary embodiment of the present invention.

FIG. 2 is a flow chart of a method of configuring the storage array, according to an exemplary embodiment of the present invention. The method 200 may begin at block 202, wherein the computer system initiates a boot sequence. A user may initiate the boot sequence by powering-up or restarting the computer system 100, for example. As discussed above, the computer system 100 operates in big real mode during the boot sequence and the host processor 102 has access to approximately 1 MB of system memory 104 for the execution of code. During the boot sequence, the host processor 102 loads machine-readable instructions from the BIOS 114 executable by the host processor 102 to test and configure the peripheral devices coupled to the host processor 102, such as the monitor 106, the keyboard 108, and the array controller 112.

At block 204, the host processor 102 may load option ROM code that includes the UI module 118. For example, the option Rom code may be loaded from a storage array option ROM on the array controller 112 or a hard drive associated with the host processor. During the running of the option ROM code the host processor 102 may be configured to respond to a user input that launches the ORCA 116. For example, the host processor 102 may be configured to respond to a particular keystroke or combination of keystrokes that indicates a command from the user to launch the ORCA 116. If the user chooses to launch the ORCA 116, the method 200 resumes at block 206, otherwise the BIOS sequence continues on to the next step of the boot sequence, for example, loading option ROM code from another option ROM on another peripheral device.

At block 206, the ORCA 116 is launched on the array controller 112 and the UI module 118 is launched on the host processor 102. At block 208, the ORCA 116 sends interface graphics to the UI module 118. In exemplary embodiments of the present invention, the interface graphics generated by the ORCA 116 may include text information adapted to provide a list of menu options available to the user. For example, the text information may include a list of menu options such as "Create Logical Drive," "View Logical Drive," "Delete Logical Drive," "Select as Boot Controller," "Exit ORCA," and the like. Additionally, the text information may include instructions to the user for selecting one of the menu options. In exemplary embodiments of the present invention, the text information corresponding to the list of menu options may be sent from the ORCA 116 to the UI module 118 via BMIC commands. The text information may then be used by the UI module 118 to generate video commands, which may be sent to the monitor 106 via BIOS interrupt calls.

At block 210, the ORCA 116 receives user input from the UI module 118. In exemplary embodiments of the present invention, the user input may be received by UI module 118 by detecting keystrokes from the keyboard 108 using BIOS interrupt calls. For example, the "up arrow" and "down arrow" keys may be used to scroll through the list of menu options and the "enter" key may be used to choose a menu option. The UI module 118 may then send the keystroke information to the ORCA 116 via BMIC commands. The ORCA 116 may then process the keystroke information and execute a configuration task that corresponds with the requested operation. For example, the configuration task may include detecting disks 110 coupled to the array controller 112. The execution of the requested operation may be carried out by the array controller 112 without involvement of the host processor 102.

Depending on the substance of the user input, the ORCA 116 may return to block 208 and send additional interface graphics to the UI module 118 corresponding to additional menu options available to the user. For example, upon selecting the "Create Logical Drive" menu option, the ORCA 116 may provide additional text information corresponding to a list of available disks 110 and the valid RAID options for the disks 110. If the user selects a menu option for configuring an array or re-configuring an existing array, the method 200 may advance to block 212.

At block 212, the ORCA 116 saves the configuration settings selected by the user in the firmware of the array controller 112. Subsequently, the ORCA 116 may return to block 208 to display additional interface graphics, for example, additional menu options or a message confirming that the requested configuration was saved. If the user selects a menu option for terminating the ORCA 116, the method may advance to block 214.

At block 214, both the ORCA 116 and the UI module 118 terminate and the host processor 102 continues processing the remainder of the BIOS code. At this time additional peripheral devices may be tested and configured. At block 216, the host processor 102 loads the operating system and the computer system 100 enters protected mode.

Figure 3:
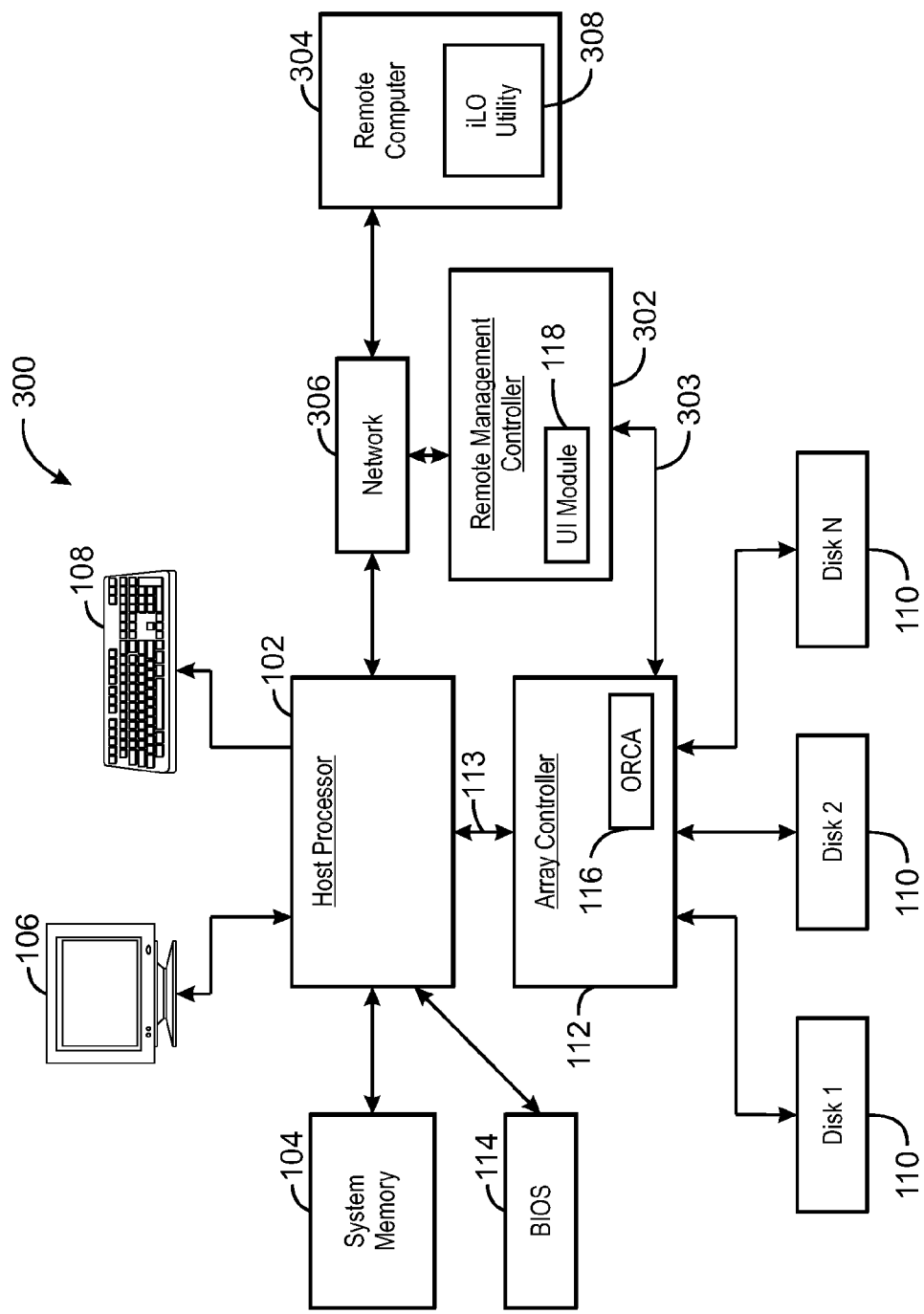
FIG. 3 is a block diagram of a computer system adapted to configure a storage array via a remote management controller, according to an exemplary embodiment of the present invention.

FIG. 3 is a block diagram of a computer system adapted to configure a storage array via a remote management controller, according to an exemplary embodiment of the present invention. The remote management controllers may include controllers using the HP iLO (Integrated Lights Out) system or controllers following the LOM (Lights Out Management) standard. As described above in relation to FIG. 1, the computer system 300 may include a processor 102, a system memory 104, a BIOS 114, and an array of disks 110 managed by the array controller 112. In exemplary embodiments of the present invention, the computer system 300 may also include a remote management controller 302, for example, an integrated lights-out (iLO) processor.

In exemplary embodiments of the present invention, the remote management controller 302 may be adapted to provide management and diagnostics functions that enable a remote user to access various components of the computer system 300. For example, the remote management controller 302 may provide remote access to information about the operating conditions of the computer system 300 such as fan speeds, processor temperatures, power supply voltages, and the like. Additionally, the remote management controller 302 may be configured to power-up or reboot the computer system 300. Accordingly, the remote management controller 302 may be powered via the "standby power" output, which is available when the system is plugged in and is in the "off" state. In other exemplary embodiments, the remote management controller 302 may receive power from a power source that is independent of the computer system's power source, for example, a battery or a separate external power cord.

The remote management controller 302 may include a processor adapted to control the overall operation of the remote management controller 302. The remote management controller 302 may also include RAM that is used by the processor to store data and execute code running on the processor. Additionally, the remote management controller 302 may include a non-volatile memory, such as flash or read-only memory used to store machine-readable instructions such as firmware. The remote management controller 302 may be coupled to various components of the computer system through the communications bus 303, which may be a system management bus (SMB), power management bus (PMB), 12C bus, PCIe bus, and the like. The communications bus 303 may be physically separated from the data channel of the computer system 300. The remote management controller 302 may also include a video capture engine that enables the remote computer 304 to view video sent from the host processor 102 to the monitor 106.

The remote management controller 302 may be accessed by the remote computer 304 via a network 306. For example, the remote management controller 302 may be accessed by the remote computer 304 via a web browser. Accordingly, the remote management controller 302 may include HTML code adapted to provide web pages to the remote computer 304. Those of ordinary skill in the art will appreciate that the network 306 may include any appropriate type of network. Examples of such networks include the Internet, a local area network (LAN), a wireless local area network (WLAN), a wireless wide area network (WWAN), and the like.

In exemplary embodiments of the present invention, the remote management controller 302 may be adapted to enable the remote user to configure the array of disks 110 via the ORCA 116 running on the array controller 112. Communications between the remote management controller 302 and array controller 112 may be performed through the host processor 102. In other exemplary embodiments, the remote management controller 302 may communicate with the array management controller 116 over the system management bus 303. Accordingly, the UI module 118 may be included in the firmware of the remote management controller 302 and adapted to run on the management controller 302.

The remote computer 304 may include an iLO utility 308 that allows the remote user to access the functions of the remote management controller 302. For example, the iLO utility 308 may enable the remote user to launch the ORCA 116 during boot-up of the computer system 300. Configuration displays generated by the ORCA 116, such as text information, may be sent to the remote computer 304 via the UI module 118 running on the remote management controller 302. Similarly, user instructions generated by the iLO utility 308, such as keystroke information, may be sent from the remote computer 304 to the ORCA 116 via the UI module 118 running on the remote management controller 302. In some exemplary embodiments, the array controller 112 and the remote management controller 302 may send the display screens and user instructions between each other via a shared memory location in the system memory 104 that is accessible to both the array controller 112 and the remote management controller 302. In other exemplary embodiments, the array controller 112 and the remote management controller 302 may send the display screens and user instructions between each other via BMIC commands.

In exemplary embodiments of the present invention, the ORCA 116 may be launched without re-booting the computer system 300. For example, the iLO utility 308 may be configured to launch the ORCA 116 while the computer system 300 is operating in protected mode. Accordingly, the ORCA 116 may be configured to run on the array controller 112 while also handling memory read and write instructions sent to it from the host processor 102. In this way, the remote user may be able view a configuration of the disk array 110 while the array of disks 110 is being used by another user. In some exemplary embodiments, some of the configuration functions of the ORCA 116 may be disabled while running in protected mode, thereby preventing the remote user from reconfiguring the array of disks 110 while they are in use. In other exemplary embodiments, all of the configuration functions of the ORCA 116 may be enabled while running in protected mode. In the later case, the ORCA 116 may be configured to send an indication to the host processor 102 indicating that the array controller 112 and the disks 110 are temporarily unavailable, thereby providing a window in which the array of disks may be reconfigured.

Figure 4:
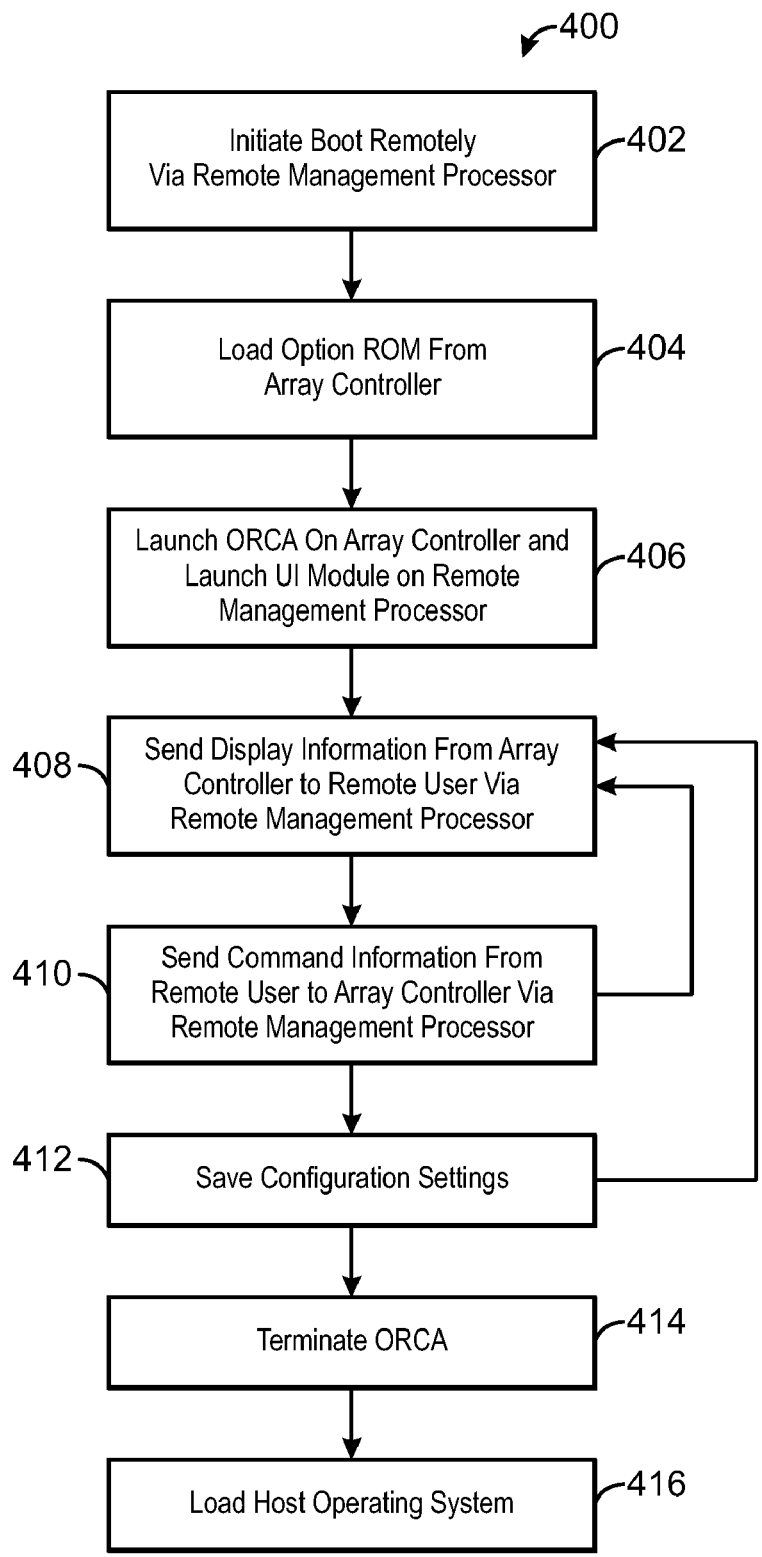
FIG. 4 is a flow chart of a method of configuring the storage array via the remote management controller, according to an exemplary embodiment of the present invention.

FIG. 4 is a flow chart of a method of configuring the storage array via a remote management controller, according to an exemplary embodiment of the present invention. The method 400 may begin at block 402, wherein a boot sequence is initiated by the remote user via the iLO utility. For example, the iLO utility may be used to cause the computer system 300 to power-up or restart. To enable the remote user to monitor the progress of the boot sequence, the remote management controller 302 may capture display screens being sent to the monitor 106 and copy the display screens to the remote computer 304.

At block 404, the host processor 102 may load the storage array option ROM from the array controller 112. During the running of the storage array option ROM, the host processor 102 may be configured to receive a user instruction to launch the ORCA 116. The instruction to launch the ORCA 116 may be sent from the remote computer 304 to the remote management controller 302. The command may then be passed to the array controller 112 via the host processor 102. Accordingly, the iLO Utility might utilize some code in the array controller's 112 Option ROM to invoke the ORCA process. In another exemplary embodiment, the command may be passed directly to the array controller over the communications bus 303 bus. If the remote user chooses to launch the ORCA 116, the method 400 advances to block 406, otherwise the host processor 102 continues on to the next step of the boot sequence.

At block 406, the ORCA 116 is launched on the array controller 112 and the UI module 118 is launched on the remote management controller 302. At block 408, the ORCA 116 sends a display screen to the UI module 118. As discussed above in reference to FIG. 2, the display screen generated by the ORCA 116 may include text information adapted to provide a list of menu options available to the user and instructions to the user regarding how to select one of the menu options. In exemplary embodiments of the present invention, the text information corresponding to the list of menu options may be sent from the ORCA 116 to the UI module 118 via bus-master interface controller (BMIC) commands or via the a shared location in the system memory 104. The UI module 118 may then send the text information from the remote management controller 302 to the remote computer 304 over the network 306. The iLO utility 308 running on the remote computer 304 may receive the text information and display the text information to the remote user.

At block 410, the ORCA 116 receives user input, such as keystroke information, from the UI module 118 running on the remote management controller 302. The keystroke information may be received by the UI module 118 from the remote computer 304. The UI module 118 may then send the keystroke information to the ORCA 116 via BMIC commands, via the shared location in the system memory 104, or directly over a system management bus. The ORCA 116 may then process the keystroke information and execute a configuration task that corresponds with the requested operation. The execution of the requested operation may be carried out by the array controller 112 without involvement of the host processor 102 or the remote management controller 302.

Depending on the substance of the user input, the ORCA 116 may return to block 408 and send additional interface graphics to the UI module 118 corresponding to additional menu options available to the user. If the user selects a menu option for configuring an array or re-configuring an existing array, the method 400 may advance to block 412.

At block 412, the ORCA 116 saves the configuration settings selected by the user into a memory on the array controller. Subsequently, the ORCA 116 may return to block 408 to display additional display screens, for example, additional menu options or a message confirming that the requested configuration was saved. If the user selects a menu option for terminating the ORCA 116, the method may advance to block 414.

At block 414, both the ORCA 116 and the UI module 118 terminate and the host processor 102 continues processing the remainder of the BIOS code. At this time additional peripheral devices may be tested and configured. At block 416, the host processor 102 loads the operating system the computer system 300 enters protected mode.

What is claimed is:

1. A computer system, comprising:
an array controller configured to run an array configuration utility, the array configuration utility being configured to generate information corresponding to a menu of user options, receive user instructions corresponding to a user selection of a user option, and process a configuration task in response to the user selection; and
a processor configured to receive the information from the array controller and send the user instructions to the array controller.

2. The computing system of claim 1, wherein the array configuration utility is configured to run during real mode operation of the computer system.

3. The computing system of claim 1, wherein the processor comprises a central processing unit of the computer system.

4. The computing system of claim 1, comprising a plurality of hard disk drives coupled to the array controller.

5. The computing system of claim 4, wherein the plurality of hard disk drives comprise a redundant array of inexpensive disks (RAID) array.

6. The computing system of claim 1, comprising a Peripheral Component Interconnect Express (PCIe) bus that couples the array controller to the processor.

7. The computing system of claim 1, wherein the processor comprises a remote management controller coupled to a remote computer via a network.

8. The computing system of claim 7, comprising a memory accessible to the processor and the remote management controller.

9. One or more tangible, machine-readable media, that store machine-readable instructions executable by one or more processors to perform a method for configuring a storage array, the tangible, machine-readable media comprising:
machine-readable instructions that, when executed by an array controller, cause the array controller to generate information corresponding to a menu of user options and send the information to a host processor; and
machine-readable instructions that, when executed by the host processor, cause the host processor to receive keystroke information from a keyboard and send the keystroke information to the array controller.

10. The tangible, machine-readable media of claim 9, comprising machine-readable instructions that, when executed by the array controller, cause the array controller to perform an array configuration task corresponding to the keystroke information received from the host processor.

11. The tangible, machine-readable media of claim 9, comprising machine-readable instructions that, when executed by the array controller cause the array controller to save a new configuration setting of the storage array.

12. The tangible, machine-readable media of claim 9, comprising machine-readable instructions that, when executed by the host processor cause the host processor to send the information to a monitor.

* * * * *